(No Model.)
C. E. HUNT.
HOOF TRIMMER.
No. 321,029. Patented June 30, 1885.
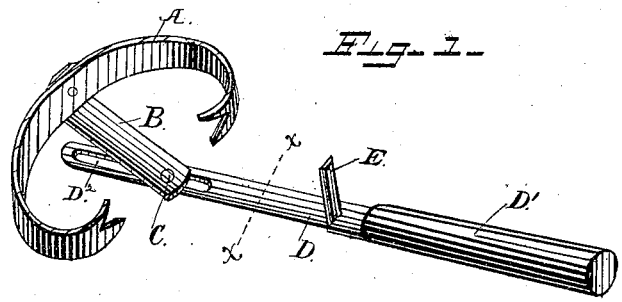
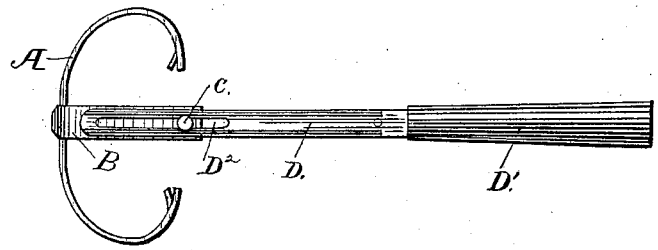
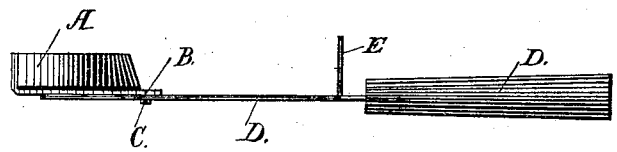
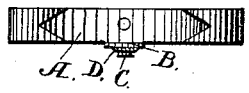
Witnesses
R. W. Bishop.
P. B. Turpin.
Inventor,
Charles E. Hunt
by R. S. & A. P. Lacey
Attys.

UNITED STATES PATENT OFFICE.

CHARLES E. HUNT, OF WAYNE, NEBRASKA.

HOOF-TRIMMER.

SPECIFICATION forming part of Letters Patent No. 321,029, dated June 30, 1885.

Application filed November 24, 1884. (No model.)

*To all whom it may concern:*

Be it known that I, CHARLES E. HUNT, a citizen of the United States, residing at Wayne, in the county of Wayne and State of Nebraska, have invented certain new and useful Improvements in Hoof-Trimmers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to hoof-trimmers; and it consists in a main arm and a rim-blade mounted thereon at approximately a right angle.

It further consists in the combination, with the clamp and the main blade or arm, of the rim-blade mounted on the said main blade or arm.

It consists, further, in other improvements, as will be hereinafter more fully described and claimed.

In the drawings, Figure 1 is a perspective view, Fig. 2 a bottom plan view, and Fig. 3 a side view, of my device. Fig. 4 is a transverse section of the main blade or arm on line $x\ x$, Fig. 1.

The claw or clamp A is preferably formed of a plate of spring metal curved, as shown, and having its ends pronged or otherwise suitably adapted to bind on the hoof, and the said ends are given a tension toward each other so that when sprung apart and adjusted onto the hoof they will, when released, bind firmly thereagainst and retain the device in operative position. The clamp is provided with a short bar, B, which is extended inwardly from the lower side of the curved plate about midway its ends. This bar, in operation, projects under the horse's hoof to about the middle portion thereof, and supports, near its extremity, a downwardly-projecting stud or pin, C.

The main arm D is provided or formed at one end with a suitable handle, D', and has cut through it, near its opposite end, a longitudinally-extended slot, $D^2$, through which the stud C projects. The head of this stud projects laterally on opposite sides of the slot $D^2$, and connects the arm D to the supporting-bar B. By this form of connection it will be seen the arm may be moved longitudinally along or rotated around the stud, enabling the adjustment of the arm to any suitable position, as may be desired, to properly trim the bottom of the hoof, the arm being for such purpose sharpened on one or both its edges, preferably the latter, as shown most clearly in Fig. 4.

A rim-blade, E, is mounted on the main arm, near the handle thereof. This blade is arranged at approximately right angles to the main arm, and is adapted to pare the rim or edge of the hoof, the adjustment of the main arm longitudinally enabling the said rim-blade to properly follow the curvature of the hoof, and the rotary movement of said arm gives the rim-blade the desired swing.

My device is simple, and in use permits the steady movement of the knife, and facilitates the trimming of the hoof both on its under side and rim.

Having thus described my invention, what I claim, and desire to secure by Letters Patent, is—

1. The combination, in a hoof-trimmer, of a clamp, a main bar connected therewith and movable longitudinally along and rotarily on the connection, and a rim-blade mounted on the main arm, substantially as set forth.

2. In a hoof-trimmer, a clamp or claw consisting of a plate of spring metal having its ends curved toward each other and given a tension in a like direction, the said ends being adapted to bind on the hoof, and provided with an inwardly-extended supporting-bar, combined with a main arm pivoted to said supporting-bar, substantially as set forth.

3. The herein-described hoof-trimmer, consisting of the clamp having supporting-bar B, the main arm having sharpened edges and provided with slot $D^2$, the stud C, projecting from bar B through the slot $D^2$, and the rim-blade mounted on the main bar, substantially as set forth.

In testimony whereof I affix my signature in presence of two witnesses.

CHARLES E. HUNT.

Witnesses:
FRANK FULLER,
H. C. WRIGHT.